(12) United States Patent
Takashima et al.

(10) Patent No.: US 9,080,570 B2
(45) Date of Patent: Jul. 14, 2015

(54) HERMETIC COMPRESSOR AND REFRIGERATION CYCLE EQUIPMENT USING THE SAME

(75) Inventors: Kazu Takashima, Fuji (JP); Kazuhiko Miura, Fuji (JP)

(73) Assignee: Toshiba Carrier Corporation, Minato-ku, Tokyo (JP)

( * ) Notice: Subject to any disclaimer, the term of this patent is extended or adjusted under 35 U.S.C. 154(b) by 673 days.

(21) Appl. No.: 13/497,812

(22) PCT Filed: Sep. 16, 2010

(86) PCT No.: PCT/JP2010/066039
§ 371 (c)(1),
(2), (4) Date: Mar. 23, 2012

(87) PCT Pub. No.: WO2011/037062
PCT Pub. Date: Mar. 31, 2011

(65) Prior Publication Data
US 2012/0174620 A1  Jul. 12, 2012

(30) Foreign Application Priority Data

Sep. 25, 2009  (JP) ................................ 2009-220755

(51) Int. Cl.
*F04B 35/04* (2006.01)
*F01C 11/00* (2006.01)
(Continued)

(52) U.S. Cl.
CPC ........... *F04C 23/008* (2013.01); *F04C 18/3564* (2013.01); *F04C 29/0021* (2013.01); *F16C 35/045* (2013.01); *F16C 35/077* (2013.01); *F25B 1/04* (2013.01); *F25B 13/00* (2013.01)

(58) Field of Classification Search
USPC ..................... 417/423.12; 418/55.6, 209–219
See application file for complete search history.

(56) References Cited

U.S. PATENT DOCUMENTS 6,287,014 B1 *  9/2001  Salla ............................. 384/546
6,439,772 B1 *  8/2002  Ommundson et al. .......... 384/99

(Continued)

FOREIGN PATENT DOCUMENTS

JP           05018360 A  *  1/1993    ............. F04B 39/00
JP         2001-323886       11/2001

(Continued)

OTHER PUBLICATIONS

International Search Report issued in PCT/JP2010/066039 on Dec. 21, 2010.

(Continued)

*Primary Examiner* — Allen Flanigan
*Assistant Examiner* — Filip Zec
(74) *Attorney, Agent, or Firm* — DLA Piper LLP (US)

(57) ABSTRACT

A closed compressor provided for achieving a wobbling suppressing effect of a rotating shaft by a bearing frame portion and improving a reliability thereof by preventing a bearing frame portion from being deformed due to a gas load includes a bearing member provided between the one end in the axial direction of the closed container and the electric motor and includes a bearing portion pivotally supporting the rotating shaft and a bearing frame portion holding the bearing portion, and the bearing frame portion includes a high rigidity portion and a low rigidity portion in a circumferential direction and the bearing frame portion is arranged in the closed container such that a direction in which a load acting on the bearing portion becomes maximum coincides with a direction in which rigidity of the bearing frame portion is high.

7 Claims, 11 Drawing Sheets

(51) Int. Cl.
- *F03C 2/00* (2006.01)
- *F03C 4/00* (2006.01)
- *F04C 2/00* (2006.01)
- *F04C 11/00* (2006.01)
- *F04C 23/00* (2006.01)
- *F01C 1/00* (2006.01)
- *F04C 18/00* (2006.01)
- *F04C 18/356* (2006.01)
- *F04C 29/00* (2006.01)
- *F16C 35/04* (2006.01)
- *F16C 35/077* (2006.01)
- *F25B 1/04* (2006.01)
- *F25B 13/00* (2006.01)

(56) References Cited

U.S. PATENT DOCUMENTS

| | | | |
|---|---|---|---|
| 2002/0131880 A1* | 9/2002 | Makino et al. | 417/423.12 |
| 2003/0180165 A1* | 9/2003 | Motomura | 417/423.12 |
| 2003/0231968 A1* | 12/2003 | Hsieh | 417/353 |
| 2004/0057859 A1 | 3/2004 | Haller | |

FOREIGN PATENT DOCUMENTS

| | | |
|---|---|---|
| JP | 2004-270680 | 9/2004 |
| JP | 2006-200363 | 8/2006 |

OTHER PUBLICATIONS

International Preliminary Report on Patentability issed in PCT/JP2010/066039 on Apr. 11, 2012.

English Language Abstract of JP 2001-323886 published Nov. 22, 2001.

English Language Translation of JP 2001-323886 published Nov. 22, 2001.

English Language Abstract of JP 2004-270680 published Sep. 30, 2004.

English Language Translation of JP 2004-270680 published Sep. 30, 2004 (also published as JP 3964371 B2).

English Language Abstract of JP 2006-200363 published Aug. 3, 2006.

English Language Translation of JP 2006-200363 published Aug. 3, 2006.

* cited by examiner

HERMETIC COMPRESSOR AND REFRIGERATION CYCLE EQUIPMENT USING THE SAME

CROSS-REFERENCE TO RELATED APPLICATIONS

This application is a National Stage of International Application No. PCT/JP2010/066039 (not published in English), filed Sep. 16, 2010, which, in turn, claims the benefit of Japanese Patent Application No. 2009-220755, filed Sep. 25, 2009.

TECHNICAL FIELD

The present invention relates to a hermetic compressor and a refrigeration cycle equipment using the hermetic compressor and, more particularly, to a hermetic compressor having an improved support structure for a bearing and a refrigeration cycle equipment using the same.

BACKGROUND ART

A general hermetic compressor houses a compression mechanism which is driven by an electric motor via a rotating shaft in a closed container, and the rotating shaft is pivotally supported by a main bearing provided at an upper portion of the compression mechanism and a sub-bearing provided at a lower portion thereof.

However, it is difficult for the conventional hermetic compressor to be rotated in a fully-balanced manner due to variations in an eccentric load of an eccentric portion for the rotating shaft, an error caused when a balancing weight is attached and the like. Unbalanced rotation causes a distal end of the rotating shaft to wobble, which results in vibration and noise. Therefore, the conventional hermetic compressor does not sufficiently satisfy demands for reduced noise, small-sized structure and higher operation performance.

Then, in order to satisfy such demands, there has been proposed a hermetic compressor which pivotally supports a rotating shaft by an end plate located on an electric motor side of a cylinder and a sub-bearing disposed on a side opposite to a compression mechanism of the electric motor (see, for example, Japanese Patent Application Laid-Open Publication No. 2001-323886: Patent Document 1).

The sub-bearing in the hermetic compressor is fixed by using a fixing member (bearing frame portion or bearing frame) having refrigerant passages. In the hermetic compressor, a gas load acting on a roller fitted into an eccentric portion of the rotating shaft at the time of refrigerant compression varies widely during one rotation of the rotating shaft, and a load on the sub-bearing increases within a predetermined angle with respect to a position of a vane groove.

However, the hermetic compressor disclosed in Patent Document 1 is designed with no consideration to a relationship between an angular position of each refrigerant passage of the fixing member for fixing the sub-bearing and an angular position at which the load on the sub-bearing increases. If any of the refrigerant passages is provided at an angular position at which the load increases, the fixing member may be deformed, an suppressing effect on wobbling of the distal end of the rotating shaft may not be sufficiently achieved by the sub-bearing, and reliability of the operation of the compressor may decrease.

DISCLOSURE OF THE INVENTION

The present invention has been conceived in consideration of the above-described circumstances and an object thereof is to provide a hermetic compressor improved in reliability on operation by preventing a bearing frame portion from being deformed by a gas load and capable of sufficiently achieving suppression effect to wobbling of a distal end of a rotating shaft caused by the bearing frame portion.

Another object of the present invention is to provide a refrigeration cycle equipment using a hermetic compressor having an improved operational reliability by preventing a bearing frame portion from being deformed by a gas load and capable of sufficiently achieving suppression effect to wobbling of a distal end of a rotating shaft caused by the bearing frame portion.

The above and other objects can be achieved by providing, in one aspect, a hermetic compressor comprising: a cylindrical closed container; an electric motor which is composed of a stator and a rotator, the stator and the rotator being housed on one end side in an axial direction in the closed container; a compression mechanism which is housed on another one end side in the axial direction of the closed container and is driven by the electric motor via a rotating shaft; and a bearing member which is provided between the one end in the axial direction of the closed container and the electric motor and is provided with a bearing portion pivotally supporting the rotating shaft and a bearing frame portion holding the bearing portion, wherein the bearing frame portion includes a portion having high rigidity and a portion having low rigidity in a circumferential direction, and the bearing frame portion is arranged in the closed container such that a direction in which a load acting on the bearing portion becomes maximum coincides with a direction in which rigidity of the bearing frame portion is high.

In the hermetic compressor, it may be desired that the high rigidity portion is located within a range of 270° to 320° in a rotation direction of the rotating shaft with respect to a position (0°) of a vane groove in a cylinder of the compression mechanism as viewed from an axial direction of the rotating shaft.

It may be also desired that the bearing frame portion include a plurality of leg portions provided so as to extend radially from a center of the bearing portion, and a direction of one leg portion of the plurality of leg portions is located within the range of 270° to 320° with respect to the vane groove.

The plurality of leg portions may be formed in a cross shape. Alternatively, the plurality of leg portions may be formed in a Y shape.

Further, a reinforcing rib may be provided at the high rigidity portion located within the range of 270° to 320° in the rotation direction of the rotating shaft.

The bearing portion may be preferably a rolling bearing.

The present invention also provides, in another aspect, a refrigeration cycle equipment includes: the above-described hermetic compressor; a condenser; an expander; an evaporator; and a four-way valve which communicates with the hermetic compressor so as to adjust a direction of refrigerant flow among the condenser, the expander, and the evaporator, the hermetic compressor, the condenser, the expander, the evaporator, and the four-way valve constituting a refrigerant flow cycle.

Further features and functional effects of the present invention will become more apparent from the following description of embodiments made with reference to the accompanying drawings.

BEST MODE FOR CARRYING OUT THE INVENTION

One embodiment of a hermetic compressor according to the present invention and a refrigeration cycle equipment according to the present invention using the hermetic compressor will be described hereunder with reference to the accompanying drawings. It is further to be noted that terms indicating directions, such as upper, lower, left, and right, in the following description are used with reference to the illustration on the accompanying drawings or states in actual use of the embodiment.

Figure 1:
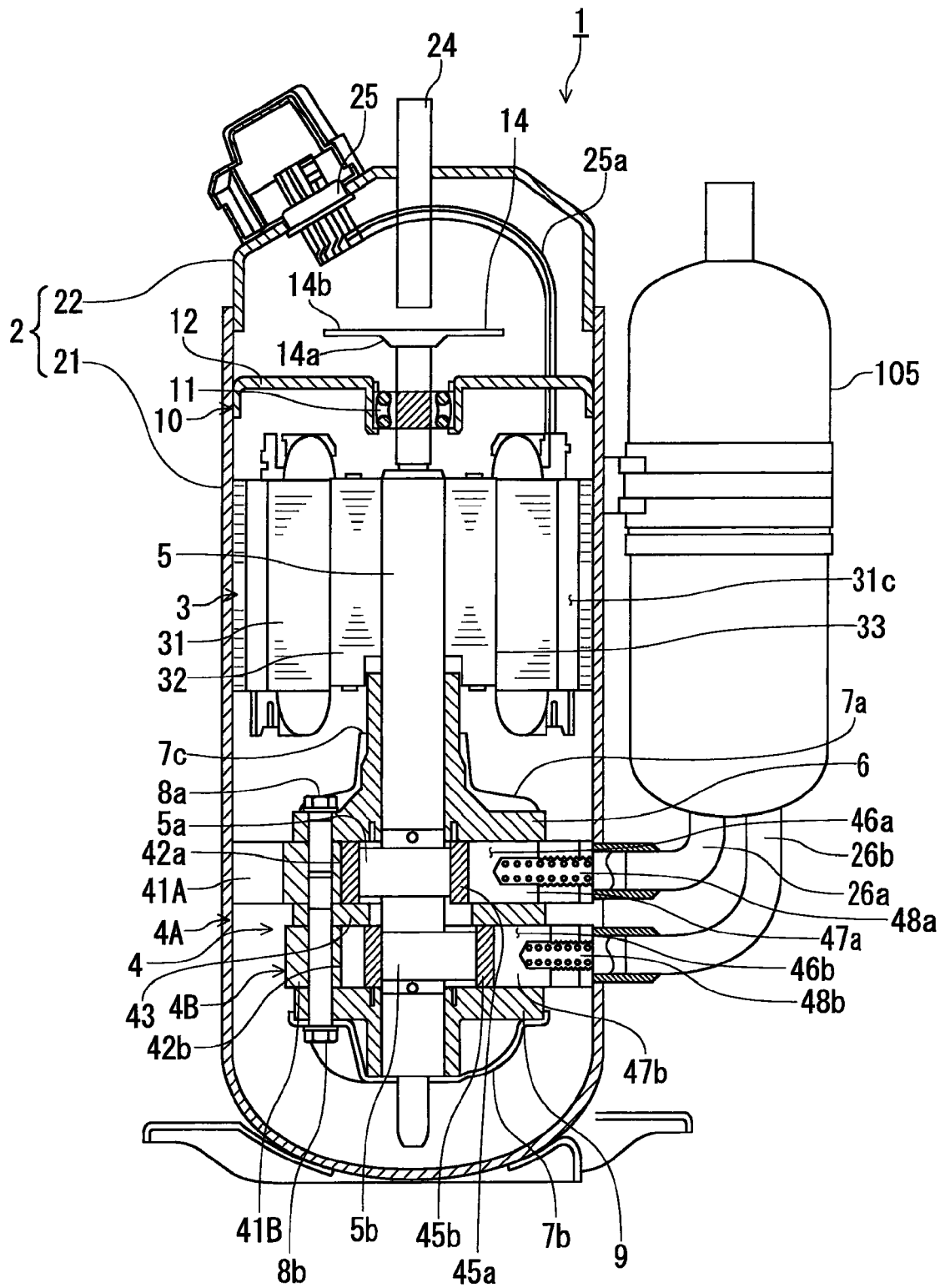
FIG. 1 is an elevational section showing one embodiment of a hermetic compressor according to the present invention.

As shown in FIG. 1, a hermetic compressor 1 includes a cylindrical closed container 2. The closed container 2 is composed of a cylindrical lower container 21 having an upper end opening, and a cup-shaped upper container 22 which covers an opening at the upper end of the lower container 21.

The upper container 22 is provided with a discharge pipe 24 disposed at a central portion thereof so as to protrude into the closed container 2. A power supply terminal 25 which is connected to a lead wire 25a is mounted on a peripheral side portion of the upper container 22.

The closed container 2 is provided with an electric motor (electric motor unit) 3 disposed at an upper portion in the lower container 21 and a compression mechanism 4 disposed at a lower portion thereof. The electric motor 3 and compression mechanism 4 are coupled through a rotating shaft 5.

As the electric motor 3, for example, a brushless DC synchronous motor is used (or an AC motor or a commercial motor may be used instead). The electric motor 3 is composed of a stator 31 which is fitted under pressure (press fit) in and is fixed to an inner surface of the closed container 2 and a rotor 32 which is rotatably arranged inside the stator 31 and is fitted on the rotating shaft 5.

Between the stator 31 and the rotor 32, a predetermined gap (air gap) 33 for rotation forming a first gas flow path is provided such that the rotor 32 is rotatably arranged.

A rotor through-hole, not shown, forming a second gas flow path is formed along the rotating shaft 5 in the rotor 32.

The compression mechanism 4 is composed of a first compression mechanism section 4A and a second compression mechanism section 4B.

The first compression mechanism section 4A is formed on an upper side of the second compression mechanism section 4B and includes a first cylinder 41A. The second compression mechanism section 4B is formed below the first cylinder 41A through an intermediate partition plate 43 therebetween and includes a second cylinder 41B.

The first and second cylinders 41A and 41B have equal inner diameter.

A first bearing (main bearing) 6 is placed on an upper surface portion of the first cylinder 41A and is attached and fixed to the first cylinder 41A via a mounting bolt 8a together with a discharge muffler 7a having a vent hole 7c formed therein (in FIG. 1, a gap between an outer periphery of the first bearing 6 and an inner periphery of the discharge muffler 7a serves as the vent hole 7c).

A second bearing (sub-bearing) 9 is placed on a lower surface portion of the second cylinder 41B and is attached and fixed to the second cylinder 41B via a mounting bolt, not shown, together with a discharge muffler 7b. The second cylinder 41B, second bearing 9, and discharge muffler 7b integrated with each other are attached and fixed to the first cylinder 41A by means of mounting bolt 8b to thereby assemble the compression mechanism 4. In the assembled compression mechanism portion 4, the first cylinder 41A is secured to the closed container 2 by means of arc spot welding, for example.

A lowermost end portion in the rotating shaft 5 is rotatably and pivotally supported by the second bearing 9, a portion above the lowermost end portion is supported to be pivotally by the first bearing 6. Additionally, the rotating shaft 5 extends through the cylinders 41A and 41B and integrally includes two eccentric portions 5a and 5b which are formed so as to have a phase difference of 180°.

The eccentric portions 5a and 5b have diameters equal to each other and are assembled so as to be located inside the inner diameter portions of the cylinders 41A and 41B, respectively. Rollers 45a and 45b having diameters equal to each other are fitted onto peripheral surfaces of the eccentric portions 5a and 5b. Axial lengths of the rollers 45a and 45b are set to be substantially equal to thicknesses (i.e., axial lengths) of the first cylinder 41A and second cylinder 41B, respectively.

Upper and lower surfaces of the first cylinder 41A and second cylinder 41B are defined by the first bearing 6, the intermediate partition plate 43 and the second bearing 9, thereby forming a first cylinder chamber 42a and a second cylinder chamber 42b in which the rollers 45a and 45b are respectively housed so as to be eccentrically rotatable. The rollers 45a and 45b can rotate eccentrically in the first and second cylinder chambers 42a and 42b.

Vane grooves 46a and 46b are formed in the first and second cylinders 41A and 41B. The vane grooves 46a and 46b are open to the cylinder chambers 42a and 42b, respectively. Vanes 47a and 47b and spring members 48a and 48b are housed in the vane grooves 46a and 46b, respectively.

In the vanes 47a and 47b, distal end portions closer to the cylinder chambers 42a and 42b are formed to be substantially semicircular in a plan view. The spring members 48a and 48b intervene between rear ends of the vanes 47a and 47b and ends of the vane grooves 46a and 46b. The spring members 48a and 48b apply elastic force (back pressure) to the vanes 47a and 47b and causes distal ends of the vanes 47a and 47b to protrude into the cylinder chambers 42a and 42b to bring the distal ends into elastic contact with peripheral surfaces of the rollers 45a and 45b, respectively.

Accordingly, when the rotating shaft 5 rotates, the eccentric portions 5a and 5b rotate eccentrically, and the rollers 45a and 45b rotate (revolve) eccentrically along inner peripheral walls of the cylinder chambers 42a and 42b, respectively, the vanes 47a and 47b reciprocate along the vane grooves 46a and 46b and are in line contact with the rollers 45a and 45b regardless of rotation angles of the rollers 45a and 45b so as to partition each of the cylinder chambers 42a and 42b into a suction chamber and a compression chamber, both not shown. The suction chambers are connected to an accumulator 105 via suction pipes 26a and 26b.

The vanes 47a and 47b are formed to have linear dimensions such that the rear ends are located in the vane grooves 46a and 46b when the distal ends are located so as to protrude into the cylinder chambers 42a and 42b to an utmost extent. The vanes 47a and 47b are formed such that distances between the rear ends of the vanes 47a and 47b and end faces of the vane grooves 46a and 46b are slightly longer than maximum compressed lengths of the spring members 48a and 48b when the vanes 47a and 47b maximally retreat.

The first bearing 6 and second bearing 9 are each provided with a discharge valve mechanism, not shown, and the discharge valve mechanisms communicate with the cylinder chambers 42a and 42b and are covered with the discharge mufflers 7a and 7b, respectively.

As will be described later, with the above-described mechanism, the discharge valve mechanisms are adapted to be opened while pressures of refrigerant gas compressed in the cylinder chambers 42a and 42b increase to a predetermined pressure and to discharge the refrigerant gas from the cylinder chambers 42a and 42b into the discharge mufflers 7a and 7b.

The refrigerant gas discharged to the discharge mufflers 7a and 7b is subjected to sound-deadening action and flow straightening action at the discharge mufflers 7a and 7b. The refrigerant gas is then blown out toward the gap 33 for rotation and rotator through-hole via the vent hole 7c formed in the discharge muffler 7a and is guided into the closed container 2.

High-pressure refrigerant gas guided from the discharge muffler 7b into the closed container 2 flows through the gap 33 for rotation, the rotator through-hole, a notched groove, and a stator through-hole 31c and flows out onto the electric motor portion 3.

A bearing member 10 is provided between one end of the closed container 2 and the electric motor portion 3. The bearing member 10 is composed of a third bearing 11 serving as a bearing portion which pivotally supports the rotating shaft 5 and a bearing frame portion 12 which holds the third bearing 11.

The third bearing 11 is a self-aligning bearing (e.g., a ball bearing) and pivotally supports a vicinity of one end (e.g., a vicinity of an upper end) of the rotating shaft 5.

Figure 2:
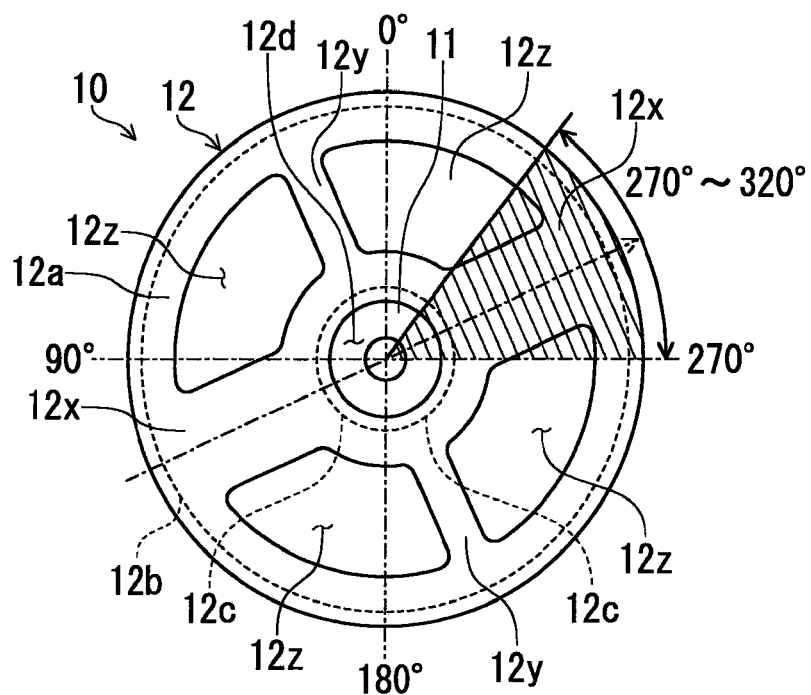
FIG. 2 is a plan view of a bearing member used in the one embodiment of the hermetic compressor according to the present invention.
Figure 3:
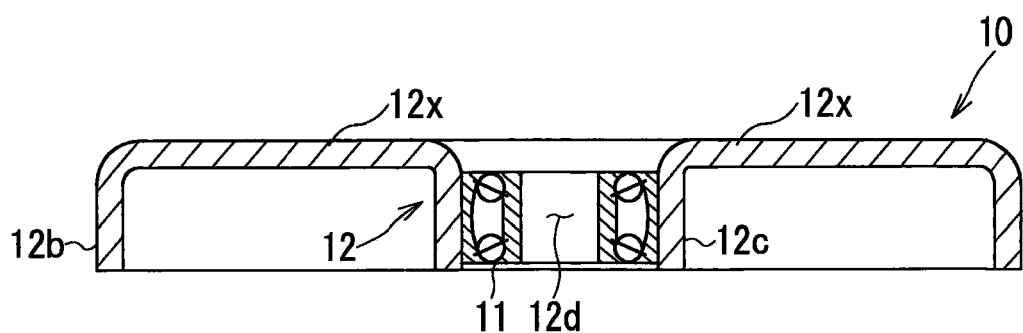
FIG. 3 is an elevational section showing the bearing member in the one embodiment of the hermetic compressor according to the present invention.

As shown in FIGS. 2 and 3, the bearing frame portion 12 includes a disc-shaped main portion 12a. The main portion 12a includes a flange portion 12b for press fitting provided at an outer periphery. The third bearing 11 is fitted in a bearing mounting hole 12d formed in a boss portion 12c which is provided at an inner periphery of the main portion 12a so as to be continuous with the main portion 12a.

The main portion 12a further includes wide leg portions 12x and narrow leg portions 12y extending outwardly and radially from a center of the bearing frame portion 12, the third bearing 11 serving as the bearing portion, which are formed in a cross shape. Four gas holes 12z are formed between the wide leg portions 12x and narrow leg portions 12y.

In FIGS. 2 and 3, portions where the leg portions 12x and 12y are located are portions having high rigidity in a circumferential direction, and portions where the gas holes 12z are located are portions having low rigidity in the circumferential direction.

Figure 4:
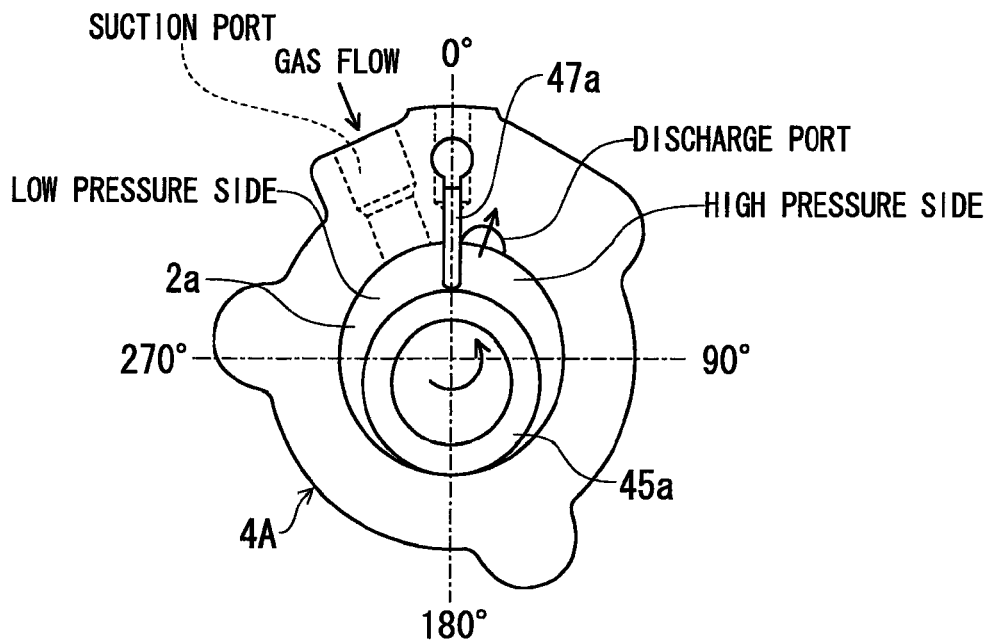
FIG. 4 is a view for explaining operation of a compression mechanism in the one embodiment of the hermetic compressor according to the present invention.

As shown in FIG. 4, in the compression mechanism 4 (FIG. 1), a load acting on the third bearing 11 becomes maximum within a range of 270° to 320° in a rotation direction of the rotating shaft with respect to the vane grooves 46a and 46b for reasons which will be described hereinlater).

Accordingly, one of the portions having high rigidity shown in FIG. 2, i.e., one of the wide leg portions 12x is located within the range of 270° to 320° (diagonally shaded in FIG. 2) in the rotation direction of the rotating shaft with respect to the vane grooves 46a and 46b.

An oil separation member 14 is screwed in the upper end of the rotating shaft 5 above the bearing frame portion 12. The oil separation member 14 has a disc shape and is composed of an inverted frustoconical boss portion 14a which is concave in cross section and a disc-shaped flange portion 14b. A distal end portion inside the closed container 2 of the discharge pipe 24 faces a center of the boss portion 14a in close proximity to the center.

Accordingly, as described above, a refrigerant gas flowing out onto the electric motor portion 3 passes through the four gas holes 12z, an oil contained in the refrigerant gas is separated by the oil separation member 14, and the refrigerant gas is discharged to the outside of the closed container 2 via the discharge pipe 24.

Now, hereunder, operation of the hermetic compressor according to the present embodiment will be described.

It is first to be noted that since the compression operation in the first compression mechanism section 4A and the compression operation in the second compression mechanism section 4B are same, the first compression mechanism section 4A will be described hereunder as an example.

As shown in FIG. 4, in the first compression mechanism section 4A, a gas refrigerant sucked into a low-pressure side of the first cylinder chamber 42a through a suction port is compressed as the roller 45a rotates eccentrically into high temperature and pressure gas which is then discharged through a discharge port.

During the compression of the refrigerant, a gas load based on a pressure difference between a gas pressure on a high-pressure side and a gas pressure on the low-pressure side is applied to the roller 45a, which results in radial loads on the first bearing 6, the second bearing 9 and the third bearing 11.

Figure 5:
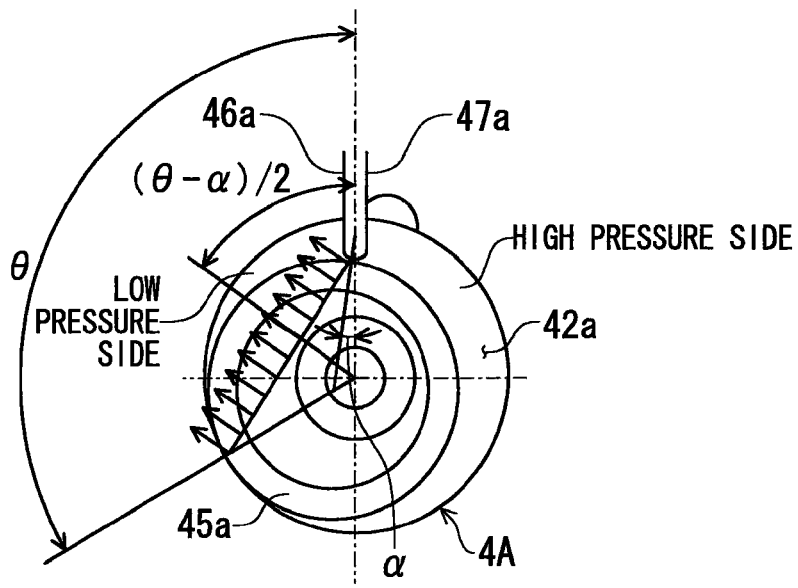
FIG. 5 is a view for explaining a gas load in the compression mechanism in the one embodiment of the hermetic compressor according to the present invention.
Figure 6:
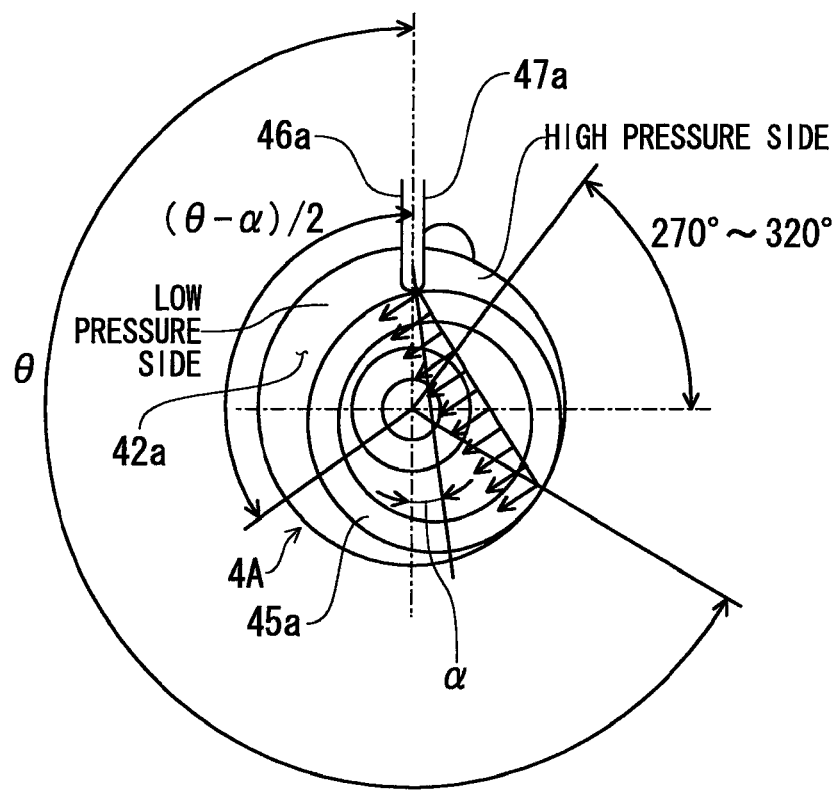
FIG. 6 is a view for explaining a gas load in the compression mechanism in the one embodiment of the hermetic compressor according to the present invention.

As shown in FIGS. 5 and 6, the magnitude of the gas load on the roller 45a and a direction of the gas load vary in accordance with the rotation of the roller 45a, i.e., rotation of the rotating shaft 5.

Figure 7:
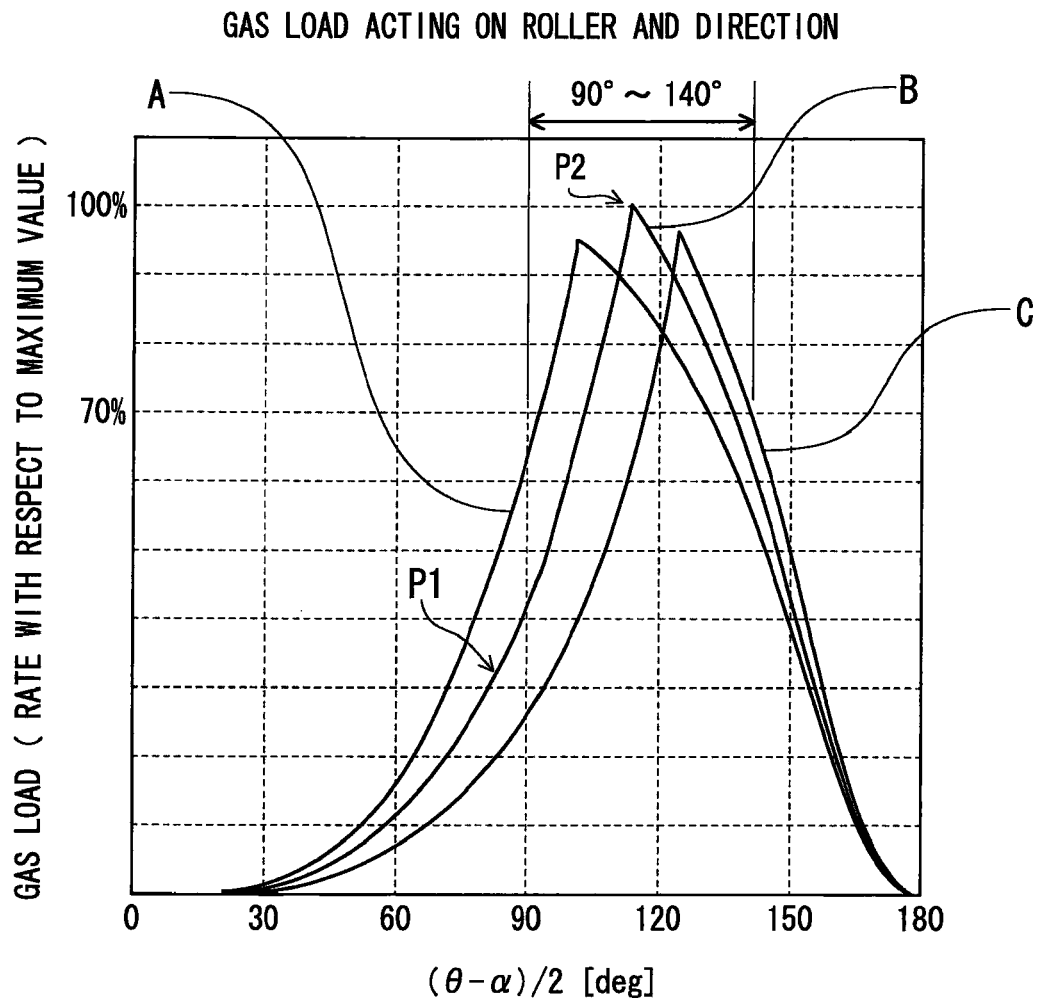
FIG. 7 is a correlation graph indicating a gas load and a direction of the gas load when the compression mechanism in the one embodiment of the hermetic compressor according to the present invention is operating.

FIG. 5 shows a state in a compression process $P_1$ shown in FIG. 7, and FIG. 6 shows a state in a compression process $P_2$ shown in FIG. 7.

Assuming that an angle θ is a rotation angle of the rotating shaft 5 with respect to the vane groove 46a, the direction (angle) of the gas load on the roller 45a will be represented by ((θ−α)/2), wherein the letter α represents an angle generated by eccentricity of the eccentric portion.

As shown in FIG. 7, the gas load varies widely during one rotation of the rotating shaft.

FIG. 7 shows calculated values indicating "a gas load acting on each roller and a direction of the gas load" when the hermetic compressor according to the present embodiment is used. Since the gas load increases with an increase in the discharge pressure, calculation is performed with the discharge pressure being fixed to a maximum value and with a suction pressure being varied.

A curve "A" indicates a case where the discharge pressure is fixed at the maximum value and the suction pressure is high, a curve "B" indicates a case where the discharge pressure is fixed at the maximum value and the suction pressure is medium, and a curve "C" indicates a case where the discharge pressure is fixed at the maximum value and the suction pressure is low. It is now to be noted that the suction pressure and the discharge pressure have values which vary depending on operational conditions at a time when the hermetic compressor is used in a refrigeration cycle equipment.

As shown in FIG. 7, in the case where the gas load reaches a maximum value (100%) in the curve "B" when the direction ((θ−α)/2) of the gas load is about 110°, it can be seen that the gas load exhibits a value as large as about 70% or more of the maximum value at an angle of 90° to 140° not only in the curve "B" but also in the curves "A" and "C".

Figure 8:
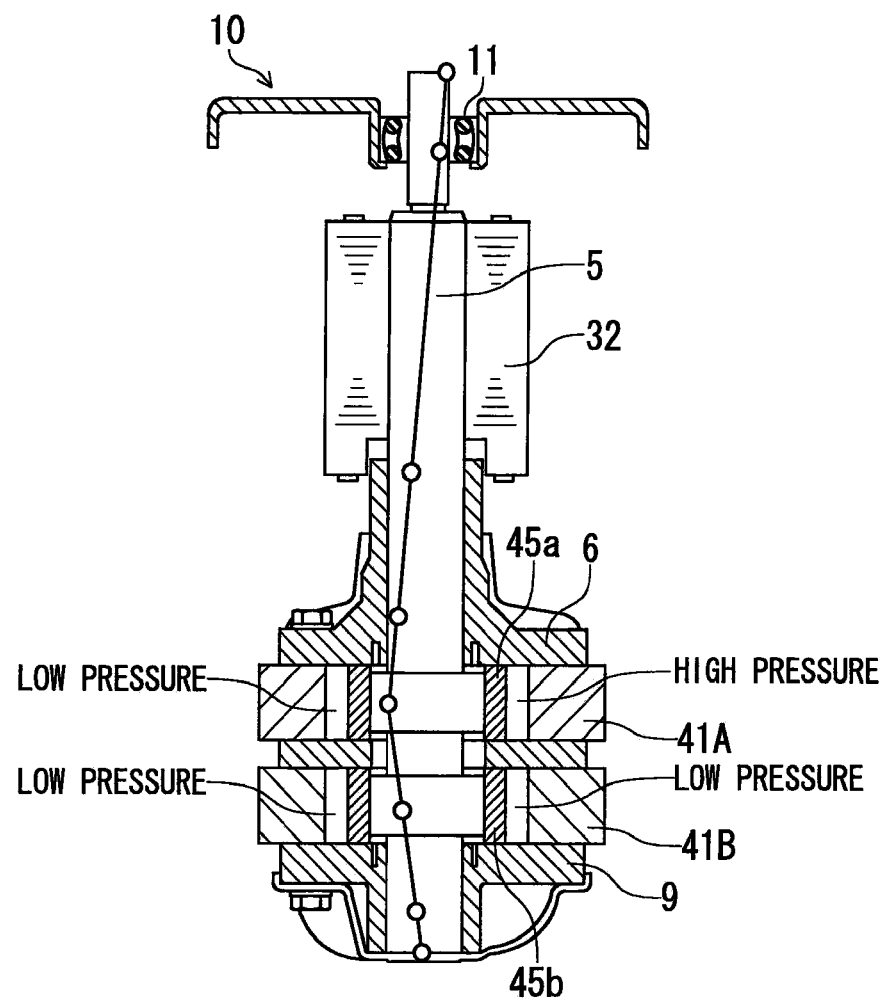
FIG. 8 is a view for explaining a deformed state of a rotating shaft in the one embodiment of the hermetic compressor according to the present invention.
Figure 9:
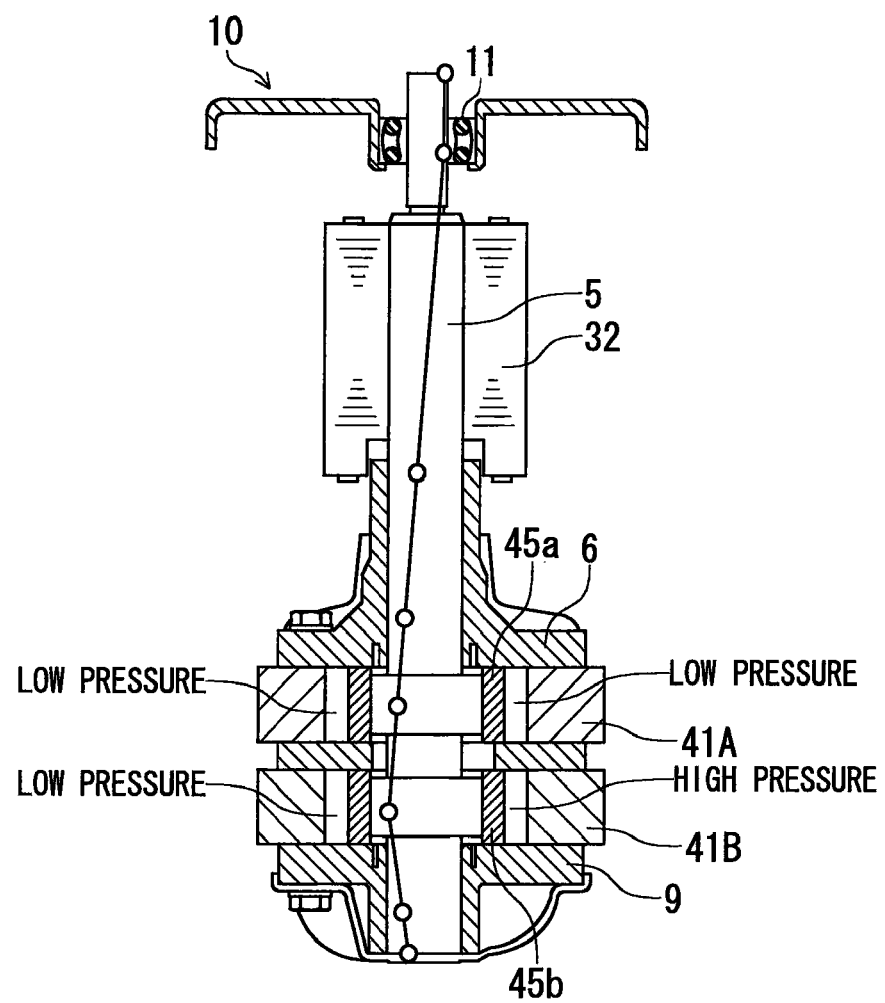
FIG. 9 is a view for explaining a deformed state of the rotating shaft in the one embodiment of the hermetic compressor according to the present invention.

FIGS. 8 and 9 represent states when the rotating shaft is deformed by a gas load and are views as seen from a direction of 180° with respect to the vane grooves.

FIG. 8 shows a state in which the eccentric portion 5a is located at a position (i.e., the state in FIG. 4) after the rotation of 180° from the vane grooves in the first cylinder chamber 42a and the eccentric portion 5b is located at a position (0°) of the vane grooves in the second cylinder chamber 42b. A right side of the first cylinder chamber 42a is under high pressure, and remaining sides are all under low pressure.

FIG. 9 shows a state after the rotating shaft 5 rotates by 180° from the state in FIG. 8, in which the eccentric portion 5a is located at the position (0°) of the vane grooves in the first cylinder chamber 42a and the eccentric portion 5b is located at the position (the state in FIG. 4) after the rotation of 180° from the vane grooves in the second cylinder chamber 42b. A right side of the second cylinder chamber 42b is under a high pressure, and remaining sides are all under a low pressure.

In both cases shown in FIGS. 8 and 9, a gas load is applied to a left side portion in FIGS. 8 and 9, and the rotating shaft 5 is deformed to the left side.

In contrast, on a third bearing 11 side, the rotating shaft 5 is deformed to a right side in FIGS. 8 and 9, i.e., in an opposing direction (having a phase difference of 180°), and a load in the same direction is applied to the bearing frame portion 12.

Therefore, in order to prevent the bearing frame portion 12 from being deformed and a position of the third bearing 11 from being shifted, it could be understood that one of the leg portions 12x and 12y that are portions having high rigidity in the circumferential direction in the present invention may be located within a range of 270° to 320° obtained by adding the phase difference of 180° to a range (90° to 140°) for a direction ((θ−α)/2) of a gas load where a gas load is about 70% or more of the maximum in the circumferential direction so as to avoid the location of the gas holes 12z that are portions having low rigidity.

This configuration prevents a gas load from deforming the bearing frame portion.

Accordingly, the bearing frame portion can be made to fully exert the wobbling suppressing effect to a distal end of the rotating shaft, and the reliability of the bearing frame portion can be improved.

In the following, a first modification of the bearing member used in the hermetic compressor according to the present embodiment will be described.

In the first modification, reinforcing ribs are provided at leg portions of the bearing member shown in FIG. 2 and used in the above embodiment.

Figure 10:
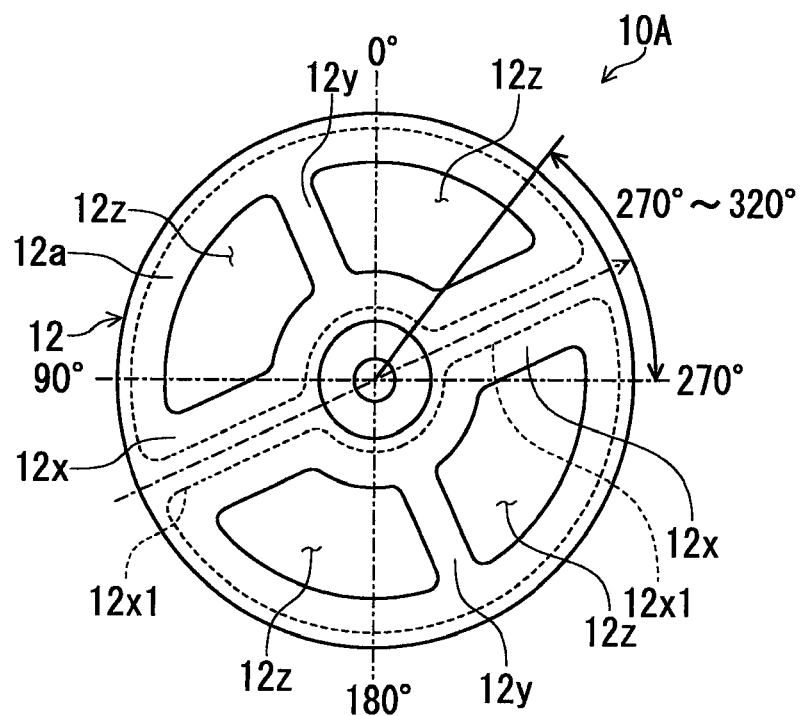
FIG. 10 is a plan view of a first modification of the bearing member in the one embodiment of the hermetic compressor according to the present invention.
Figure 11:
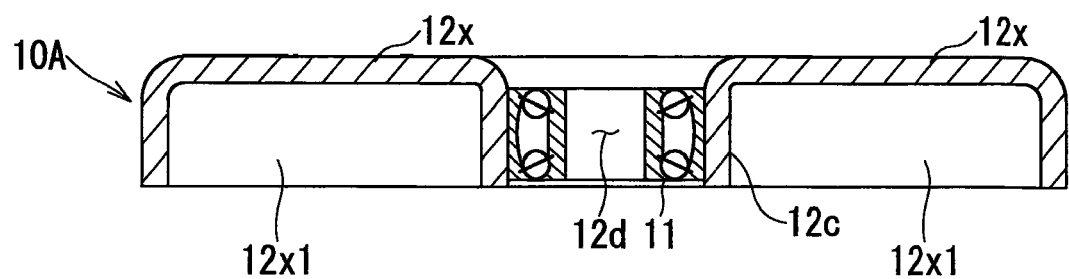
FIG. 11 is an elevational section showing the first modification of the bearing member in the one embodiment of the hermetic compressor according to the present invention.

For example, as shown in FIGS. 10 and 11, a reinforcing rib 12x1 is provided at the wide leg portion 12x of a bearing member 10A that is located within the range of 270° to 320° in the rotation direction of the rotating shaft with respect to the vane grooves.

The above configuration makes it possible to use a thin metal plate as the bearing member and prevent the bearing frame portion from being deformed due to a gas load at low cost.

It is further to be noted that since the other components are not different from those of the bearing member shown in FIG. 2, the components thereof are denoted by adding the same reference numerals, and a description thereof will be omitted.

A second modification of the bearing member used in the present embodiment will be described hereunder.

In the second modification, leg portions are provided in a straight line, unlike the leg portions provided in a cross shape of the bearing member used in the above embodiment shown in FIG. 2.

Figure 12:
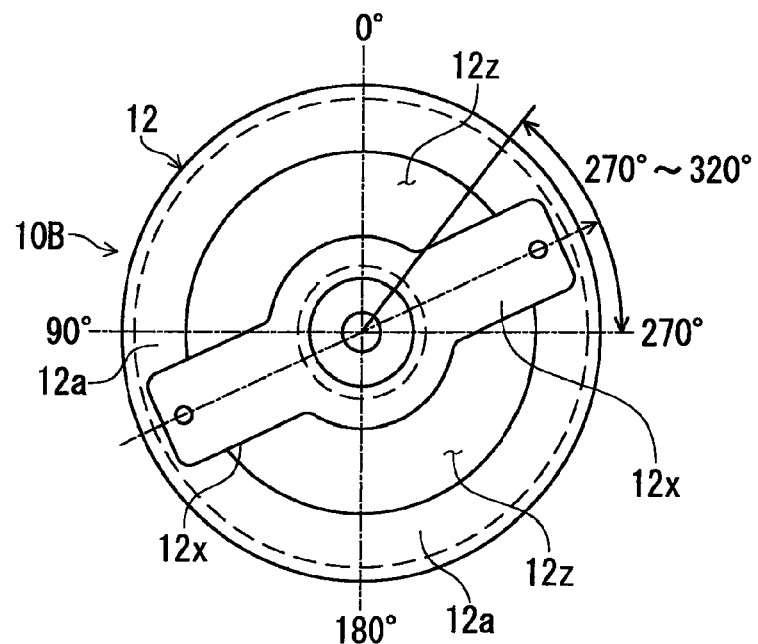
FIG. 12 is a plan view of a second modification of the bearing member in the one embodiment of the hermetic compressor according to the present invention.
Figure 13:
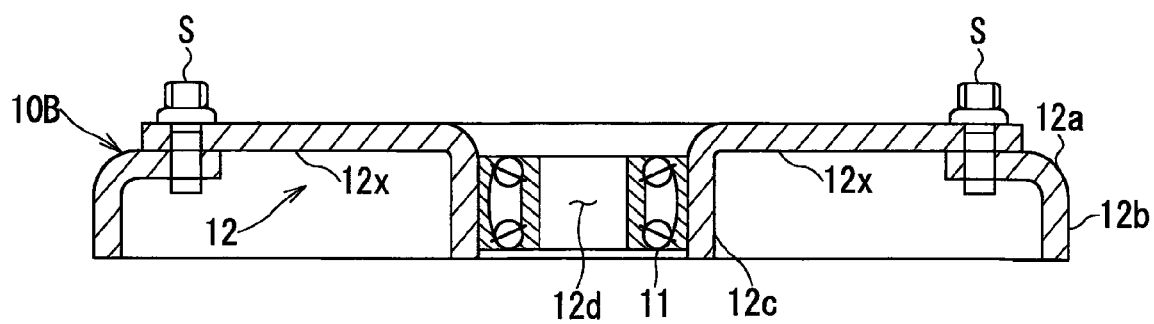
FIG. 13 is an elevational section showing the second modification of the bearing member in the one embodiment of the hermetic compressor according to the present invention.

For example, as shown in FIGS. 12 and 13, a bearing member 10B is composed of the third bearing 11 serving as the bearing portion that pivotally supports the rotating shaft 5 and the bearing frame portion 12 that holds the third bearing 11. The bearing frame portion 12 includes the ring-shaped main portion 12a having the flange portion 12b for press fitting provided at an outer periphery in a manner continuous to the main portion 12a and the boss portion 12c having the bearing mounting hole 12d formed at a central portion.

The bearing frame portion 12 is composed of the two leg portions 12x extending outwardly and radially from a center (a center of the third bearing 11 serving as the bearing portion). Outer ends of the two leg portions 12x are screwed in the ring-shaped main portion 12a by means of screws S, respectively.

In the bearing member 10B, one of the two leg portions 12x is located within the range of 270° to 320° in the rotation direction of the rotating shaft with respect to the vane grooves.

This configuration simplifies a shape of the bearing member and makes it possible to prevent the bearing frame portion from being deformed due to a gas load at low cost.

A third modification of the bearing member used in the present embodiment will be further described hereunder.

In the third modification, leg portions are provided in a Y shape, unlike the leg portions provided in a cross shape of the bearing member used in the above embodiment shown in FIG. 2.

Figure 14:
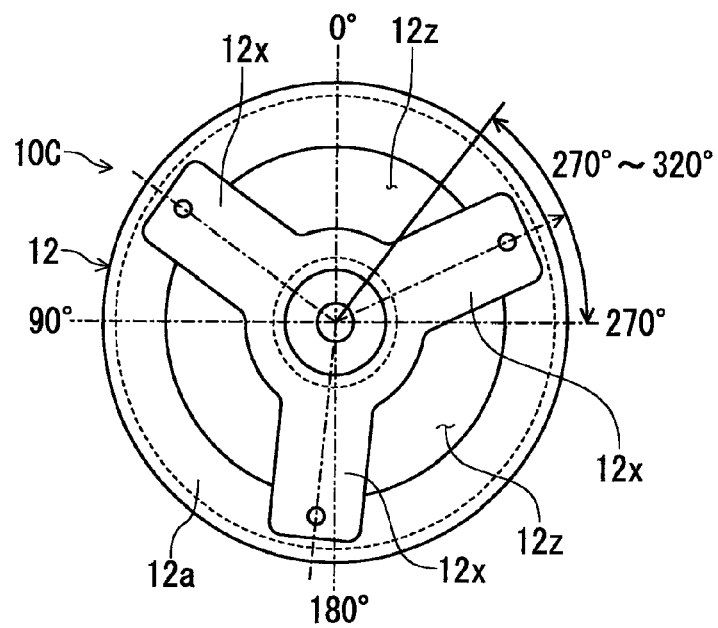
FIG. 14 is a plan view of a third modification of the bearing member in the one embodiment of the hermetic compressor according to the present invention.
Figure 15:
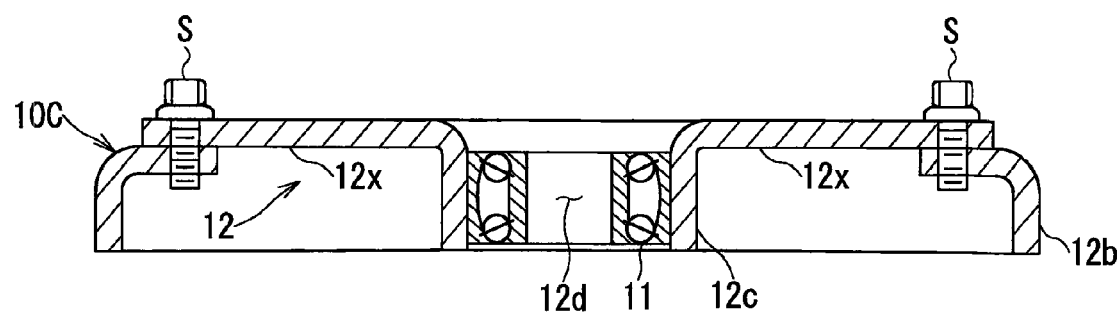
FIG. 15 is an elevational section showing the third modification of the bearing member in the one embodiment of the hermetic compressor according to the present invention.

For example, as shown in FIGS. 14 and 15, a bearing member 10C is composed of the third bearing 11 serving as the bearing portion that pivotally supports the rotating shaft 5 and the bearing frame portion 12 that holds the third bearing 11. The bearing frame portion 12 includes the ring-shaped main portion 12a having the flange portion 12b for press fitting provided at an outer periphery in a manner to be continuous to the main portion 12a and the boss portion 12c having the bearing mounting hole 12d formed at a central portion.

The bearing frame portion 12 is composed of the three leg portions 12x extending outwardly and radially from the center (the center of the third bearing 11 serving as the bearing portion). Outer ends of the three leg portions 12x are screwed in the ring-shaped main portion 12a by means of screws S, respectively.

In the bearing member 10C, one of the three leg portions 12x is located within the range of 270° to 320° in the rotation direction of the rotating shaft with respect to the vane grooves.

This configuration simplifies a shape of the bearing member and makes it possible to prevent the bearing frame portion from being deformed due to a gas load at low cost.

As described above, according to the hermetic compressor of the present embodiment and modifications, it can be realized to provide the hermetic compressor improved in reliability by preventing a gas load from deforming a bearing frame portion to cause the bearing frame portion to fully exert a suppressing effect on wobbling of a distal end of a rotating shaft.

Now, hereunder, a refrigeration cycle equipment using the hermetic compressor according to the present embodiment will be described with reference to FIG. 16.

Figure 16:
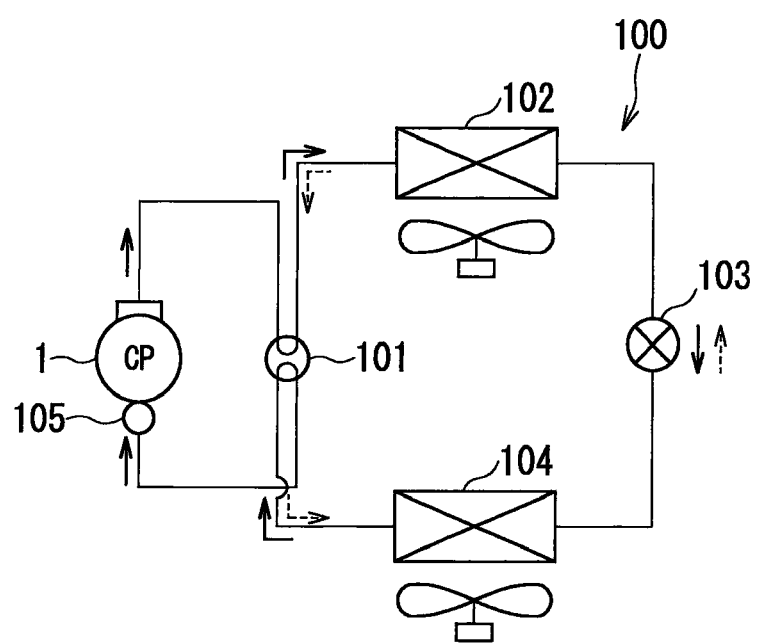
FIG. 16 is a schematic diagram of a refrigeration cycle equipment provided with the hermetic compressor according to the one embodiment of the present invention.

A refrigeration cycle equipment 100 shown in FIG. 16 is provided with the hermetic compressor 1 according to the present embodiment, a four-way valve 101, an outdoor heat exchanger 102, an expansion device 103, an indoor heat exchanger 104, and the accumulator 105, all of which are connected so as to provide a cyclic system so as to communicate with each other.

In the refrigeration cycle equipment 100, at the time of air cooling, a refrigerant discharged from the hermetic compressor 1 is supplied to the outdoor heat exchanger 102 via the four-way valve 101 as indicated by solid arrows. At the outdoor heat exchanger 102, the refrigerant exchanges heat with outside air and is condensed.

The condensed refrigerant flows out from the outdoor heat exchanger 102 and is fed to the indoor heat exchanger 104 via the expansion device 103. At the indoor heat exchanger 104, the refrigerant exchanges heat with indoor air and evaporates to cool the indoor air. The refrigerant flowing out from the indoor heat exchanger 104 is sucked into the hermetic compressor 1 via the four-way valve 101 and accumulator 105.

At the time of air heating, a refrigerant discharged from the hermetic compressor 1 is supplied to the indoor heat exchanger 104 via the four-way valve 101, as indicated by broken arrows. At the indoor heat exchanger 104, the refrigerant exchanges heat with indoor air and is condensed to heat the indoor air. The condensed refrigerant flows out from the indoor heat exchanger 104 and is fed to the outdoor heat exchanger 102 via the expansion device 103. At the outdoor heat exchanger 102, the refrigerant exchanges heat with outdoor air and evaporates. The evaporated refrigerant flows out from the outdoor heat exchanger 102 and is sucked into the hermetic compressor 1 via the four-way valve 101 and accumulator 105. Thereafter, the refrigerant is sequentially fed in the same manner, and the refrigeration cycle operation is continued.

According to the above-described refrigeration cycle equipment of the present embodiment, there is realized and provided a refrigeration cycle equipment capable of achieving an improvement in reliability by preventing a gas load in a hermetic compressor from deforming a bearing frame portion to cause the bearing frame portion to fully exert a suppression effect on wobbling of a distal end of a rotating shaft.

It is further noted that although the present invention is not limited to the above-described embodiment, many other modifications or alternations may be made without departing from scopes of the appended claims.

The invention claimed is:

1. A hermetic compressor comprising:
a cylindrical closed container;
an electric motor including a stator and a rotator, the stator and the rotator being housed on a one end side in an axial direction in the closed container;
a compression mechanism housed on another end side in the axial direction of the closed container and driven by the electric motor via a rotating shaft; and
a bearing member provided between the one end in the axial direction of the closed container and the electric motor and including a bearing portion pivotally supporting the rotating shaft and a bearing frame portion holding the bearing portion,
wherein the bearing frame portion includes a portion having high rigidity and a portion having low rigidity in a circumferential direction, and the bearing frame portion is arranged in the closed container such that a direction in which a load acting on the bearing portion becomes maximum coincides with a direction in which rigidity of the bearing frame portion is high, and
the high rigidity portion is located within a range of 270° to 320° in a rotation direction of the rotating shaft with respect to a position (0°) of a vane groove in a cylinder of the compression mechanism as viewed from an axial direction of the rotating shaft.

2. The hermetic compressor according to claim 1, wherein the bearing frame portion includes a plurality of leg portions provided so as to extend radially from a center of the bearing portion, and a direction of one leg portion of the plurality of leg portions is located within the range of 270° to 320° with respect to the vane groove.

3. The hermetic compressor according to claim 2, wherein the plurality of leg portions are formed in a cross shape.

4. The hermetic compressor according to claim 2, wherein the plurality of leg portions are formed in a Y shape.

5. The hermetic compressor according to claim 1, wherein a reinforcing rib is provided at the high rigidity portion located within the range of 270° to 320° in the rotation direction of the rotating shaft.

6. The hermetic compressor according to claim 1, wherein the bearing portion is a rolling bearing.

7. A refrigeration cycle equipment comprising:
a hermetic compressor according to claim 1;
a condenser;
an expander;
an evaporator; and
a four-way valve communicating with the hermetic compressor to adjust a direction of refrigerant flow through the condenser, the expander and the evaporator,
the hermetic compressor, the condenser, the expander, the evaporator, and the four-way valve constituting a refrigerant flow cycle.

* * * * *